(12) United States Patent
Schmidt et al.

(10) Patent No.: US 12,217,136 B2
(45) Date of Patent: Feb. 4, 2025

(54) GENERALIZED EXPECTATION MAXIMIZATION FOR SEMI-SUPERVISED LEARNING

(71) Applicant: Oracle International Corporation, Redwood Shores, CA (US)

(72) Inventors: Felix Schmidt, Niederweningen (CH); Yasha Pushak, Vancouver (CA); Stuart Wray, Cambridge (GB)

(73) Assignee: Oracle International Corporation, Redwood Shores, CA (US)

( * ) Notice: Subject to any disclaimer, the term of this patent is extended or adjusted under 35 U.S.C. 154(b) by 918 days.

(21) Appl. No.: 16/935,313

(22) Filed: Jul. 22, 2020

(65) Prior Publication Data

US 2022/0027777 A1    Jan. 27, 2022

(51) Int. Cl.
*G06N 20/00*         (2019.01)
*G06F 16/901*        (2019.01)
*G06N 5/04*          (2023.01)

(52) U.S. Cl.
CPC .......... *G06N 20/00* (2019.01); *G06F 16/901* (2019.01); *G06N 5/04* (2013.01)

(58) Field of Classification Search
CPC ................................ G06N 20/00; G06N 5/04
See application file for complete search history.

(56) References Cited

U.S. PATENT DOCUMENTS

2021/0103794 A1*   4/2021   Jung ..................... G06N 3/045

OTHER PUBLICATIONS

Guan et al., "Detecting potential labeling errors for bioinformatics by multiple voting", 2014, Knowledge-Based Systems, vol. 66, pp. 28-35 (Year: 2014).*
Goldman et al., "Enhancing Supervised Learning with Unlabeled Data", 2000, ICML, vol. 2000, pp. 327-334 (Year: 2000).*
Yuan et al., "Iterative Cross Learning on Noisy Labels", 2018, 2018 IEEE Winter Conference on Applications of Computer Vision (WACV), vol. 2018, pp. 757-765 (Year: 2018).*
Erman et al., "Semi-Supervised Network Traffic Classification", 2007, SIGMETRICS '07, vol. 2007, pp. 369-370 (Year: 2007).*

(Continued)

*Primary Examiner* — Ann J Lo
*Assistant Examiner* — Leonard A Sieger
(74) *Attorney, Agent, or Firm* — Hickman Becker Bingham Ledesma LLP

(57) ABSTRACT

Techniques are described that extend supervised machine-learning algorithms for use with semi-supervised training. Random labels are assigned to unlabeled training data, and the data is split into k partitions. During a label-training iteration, each of these k partitions is combined with the labeled training data, and the combination is used train a single instance of the machine-learning model. Each of these trained models are then used to predict labels for data points in the k−1 partitions of previously-unlabeled training data that were not used to train of the model. Thus, every data point in the previously-unlabeled training data obtains k−1 predicted labels. For each data point, these labels are aggregated to obtain a composite label prediction for the data point. After the labels are determined via one or more label-training iterations, a machine-learning model is trained on data with the resulting composite label predictions and on the labeled data set.

14 Claims, 6 Drawing Sheets

(56) References Cited

OTHER PUBLICATIONS

Chaudhari et al., "Learning from Positive and Unlabelled Examples Using Maximum Margin Clustering", 2012, International Conference on Neural Information Processing, vol. 2012, pp. 465-473 (Year: 2012).*

Sun et al., "Study of ensemble learning-based fusion prognostics", 2010 Prognostics and System Health Management Conference, vol. 2010, pp. 1-7 (Year: 2010).*

Brodley et al., "Identifying Mislabeled Training Data", 1999, Journal of Artificial Intelligence Research, vol. 11 (1999), pp. 131-167 (Year: 1999).*

Zhou et al., "Semi-Supervised Regression with Co-Training", 2005, IJCAI, vol. 5 (2005), pp. 1-6 (Year: 2005).*

Seeger et al., "Input-dependent Regularization of Conditional Density Models", 2000, LAPMAL—Laboratory for Probabilistic Machine Learning (Year: 2000).*

Brodley et al., "Identifying Mislabeled Training Data", 1999, Journal of Artificial Intelligence Research, vol. 11 (1000), pp. 131-167 (Year: 1999).*

Yan et al., "Robust Semi-Supervised Learning through Label Aggregation", 2016, Proceedings of the Thirtieth AAAI Conference on Artificial Intelligence (AAAI-16), vol. 30 (2016), pp. 2244-2250 (Year: 2016).*

Moon, Todd K. "The Expectation-maximization Algorithm." IEEE Signal processing magazine 13.6 (1996), pp. 47-60.

Brownlee, Jason, "A Gentle Introduction to K-Fold Cross Validation", https://machinelearningmastery.com/k-fold-cross-validation/, dated May 23, 2018, 43 pages.

\* cited by examiner

202 — ASSIGN A RANDOM LABEL TO EACH DATA POINT IN AN UNLABELED SET OF DATA TO PRODUCE A WORKING SET OF DATA

204 — PARTITION THE WORKING SET OF DATA INTO A PLURALITY OF DATA PARTITIONS

206 — TRAIN AN INTERIM MACHINE-LEARNING MODEL BASED ON A SET OF LABELED DATA AND SAID EACH DATA PARTITION TO PRODUCE A TRAINED INTERIM MACHINE-LEARNING MODEL

208 — APPLY THE TRAINED INTERIM MACHINE-LEARNING MODEL TO PREDICT A PREDICTED LABEL FOR DATA POINTS IN A SET OF DATA PARTITIONS, OF THE PLURALITY OF DATA PARTITIONS, OTHER THAN SAID EACH DATA PARTITION

210 — FOR EACH DATA POINT OF THE WORKING SET OF DATA: BASED ON THE SET OF PREDICTED LABELS FOR SAID EACH DATA POINT, GENERATE A COMPOSITE PREDICTED LABEL, AND APPLY THE COMPOSITE PREDICTED LABEL TO SAID EACH DATA POINT

212 — AFTER APPLYING THE COMPOSITE PREDICTED LABEL TO EACH DATA POINT, OF THE WORKING SET OF DATA, TRAIN A PARTICULAR MACHINE-LEARNING MODEL BASED, AT LEAST IN PART, ON THE WORKING SET OF DATA AND THE SET OF LABELED DATA

214 — APPLY THE TRAINED PARTICULAR MACHINE-LEARNING MODEL TO INFER A PREDICTION FOR A PARTICULAR DATA POINT

GENERALIZED EXPECTATION MAXIMIZATION FOR SEMI-SUPERVISED LEARNING

FIELD OF THE INVENTION

The present invention relates to training machine-learning models, and, more specifically, to increasing the effectiveness of semi-supervised training of machine-learning models using principles of expectation maximization.

BACKGROUND

Machine learning (ML) facilitates automatic performance of complex computations, such as natural language processing, image recognition, retrieving information from unorganized text, anomaly detection, etc. For anomaly detection, machine learning is used to predict whether particular data is anomalous, i.e., whether it deviates from the majority of a body of data of which the particular data is a part. Anomaly detection may be used to identify fraud or other threats in many contexts, such as computer networking, banking, financial securities, etc. An ML model may be trained to identify whether particular anomalous data is indicative of fraud, or is a threat. Based on such predictions, actions may be taken to neutralize the detected threat.

Machine learning algorithms and models are typically most effective when large datasets with known labels are available for training (a situation often referred to as supervised learning). However, obtaining accurate labels is often substantially more costly than obtaining data, as many situation require domain experts to manually label the data. In practice, it is often only possible to obtain high-quality labels for a small fraction of an applicable data set, especially when the applicable data set is sizeable. Many times, a small set of labeled data is augmented with a large quantity of unlabeled data to train an ML model. This scenario is typically referred to as semi-supervised learning. In semi-supervised learning, it is left to the ML model to learn and reflect any structure that is present in unlabeled data, and to combine the derived information with information from labeled data.

There are numerous existing approaches to improving machine learning based on unlabeled data. For example, active learning methods allow an ML algorithm to interactively query a domain expert to obtain labels for unlabeled data points. Another method of maximizing results from unlabeled data-based training is called Expectation Maximization (EM). EM begins by randomly labelling the available unlabeled data and then fitting a simple ML model, such as a Gaussian mixture model, to the full data set, which includes data with known labels and data with random labels. This model is then used to predict values (i.e., obtain expectations for) the labels of the originally-unlabeled data. The training set is updated with the predicted label expectations for the originally-unlabeled data, and the ML model is retrained based on the full data set with the label expectations. EM continues to iterate between training the model and predicting and updating labels until the process converges (or reaches a maximum number of iterations).

However, EM is most effective when applied with relatively simple ML models, such as the Gaussian mixture model. To illustrate, the expectation step in an EM iteration makes use of properties of Gaussian mixture models that allow for more accurate representations of label expectations than simple point estimates. Further, the simplicity of the Gaussian mixture model prevents the model from overfitting to the training data by learning complicated patterns from the noise introduced by the randomness of the predicted labels. However, such simple models are not always sufficient to predict outcomes for every kind of situation, such as for anomaly detection, which require modeling of complex data patterns. Thus, it would be beneficial to enhance semi-supervised training techniques to allow utilization of unlabeled data to train complex ML models.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts a flowchart for semi-supervised training of an ML model using generalized expectation maximization.

DETAILED DESCRIPTION

Figure 1:
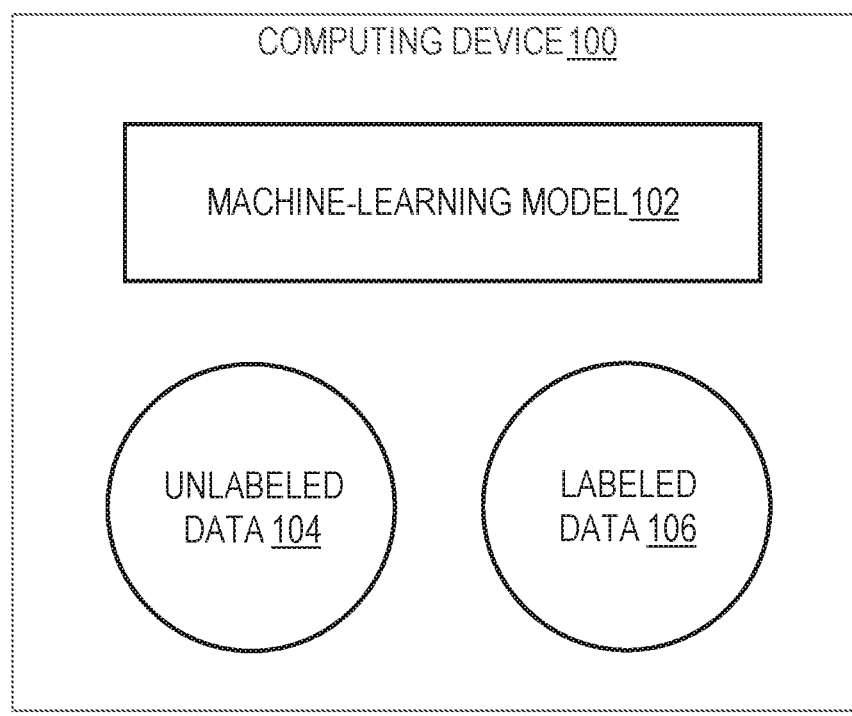
FIG. 1 is a block diagram that depicts an example computing device with an example machine-learning model and example labeled and unlabeled data.

In the following description, for the purposes of explanation, numerous specific details are set forth in order to provide a thorough understanding of the described techniques. It will be apparent, however, that the techniques described herein may be practiced without these specific details. In other instances, well-known structures and devices are shown in block diagram form in order to avoid unnecessarily obscuring the described techniques.

General Overview

Techniques are described herein for Generalized Expectation Maximization (GEM), which allows many kinds of ML algorithms, including those that generally function most effectively based on supervised training, to be effectively trained using semi-supervised training techniques. Before training an ML model using both labeled and unlabeled data, GEM performs one or more label-training iterations, by which k-fold techniques and EM techniques are utilized to identify labels for the unlabeled data.

More specifically, GEM assigns random labels to a set of unlabeled training data and then splits the previously-unlabeled training data into k equally-sized partitions. During one or more label-training iterations, each of these k partitions is combined with the entire set of labeled training data, and the combination of labeled and previously-unlabeled data from the partition is used train a single instance of the ML model. Each of these trained models are then used to predict labels for data points in the k−1 partitions of previously-unlabeled training data that were not used during training of the model. In this way, every data point in the previously-unlabeled training data is assigned k−1 predicted labels. For each data point, these labels are aggregated to obtain a composite label prediction for the data point. After the one or more label-training iterations, an ML model is then trained on the previously-unlabeled training data, now labeled with the composite label predictions, and the labeled data set.

GEM extends the high-level idea underlying EM for use with any ML algorithm and model, including ML models that are able to model complex data structures. Thus, unlike EM, GEM can be used for both classification and regression. Given the high cost of producing labeled training data, the fact that GEM allows more complex ML models to be trained in a semi-supervised setting reduces the overall cost of ML training, in that less labeled data is required to train a complex model that normally would require supervised training. Furthermore, in many applications, relatively few label-training iterations are required to prepare the unlabeled data to train an ML model using GEM versus using EM techniques, which reduces the cost of preparing the training data for semi-supervised training.

K-Fold Techniques for Expectation Maximization

According to an embodiment, GEM uses k-fold techniques to increase the effectiveness of semi-supervised learning being applied to ML models that are able to model complex data structures, such as Random Forest, or artificial neural networks. K-fold is a technique of splitting a dataset into k subsets. This technique is commonly used for k-fold cross-validation, which estimates the ability of a trained ML model to generate accurate predictions. To illustrate, in a k-fold cross-validation, a training dataset is split into k subsets. An ML model is trained on k−1 of the subsets and then is used to predict labels for a particular data subset on which the model was not trained. The accuracy of the predicted labels is determined based on known labels for the particular data subset. Generally, the results are used to tune the ML model.

According to one or more embodiments, unlike k-fold cross-validation, which uses k-fold principles to validate a trained model, k-fold principles are used herein, in connection with EM principles, to perform semi-supervised training of an ML model. According to an embodiment, a computing device, such as computing device 100 of FIG. 1, determines to initialize GEM-based semi-supervised training for an ML model 102, e.g., based on a request from a user to train the model. An example request to train model 102 identifies: a set of training data with unknown predictions (e.g., unlabeled data 104), a set of training data with known predictions (i.e., labeled data 106 with domain-expert determined labels), a number of partitions (such as 20), and a number of label-training iterations (such as 1).

The following Pseudocode 1 depicts an example embodiment of GEM implemented by computing device 100:

```
Pseudocode 1:
    res = { }
    For i in [0, ..., n−1]:
        For each train, test in KFold(unknown,k):
            model.fit(test U known,test.labels U known.labels)
            res.accumulate( model.predict(train))
        unknown.labels = res.composite( )
    model.fit(unknown U known,unknown.labels U known.labels)
    Return model, unknown.labels
```

In Pseudocode 1, KFold is a function that partitions a set of data ("unknown") into k partitions, and is generally used for k-fold validation purposes. As such, it is assumed that this function returns k pairs of "training" data sets and "test" data sets from unknown, where a "training" data set contains k−1 partitions of the data and a corresponding "test" data set contains the remaining partition of the k partitions. These partitions are used as described below for GEM, rather than for k-fold validation.

Furthermore, according to one or more embodiments, res.composite in Pseudocode 1 may be implemented in various ways to address the needs of a given application. For example, if the ML model is being trained for regression, res.composite is implemented using a numerical composite function that represents a statistical measure of central tendency, such as a function based on one or more of mean, median, geometric mean, mode, standard deviation, etc. However, if the ML model is being trained for classification, res.composite is implemented using a frequency-based composite function, such as the mode of a set of predicted values.

FIG. 2 depicts a flowchart 200 for semi-supervised training of an ML model using GEM, according to an embodiment. Specifically, at step 202, a random label is assigned to each data point in an unlabeled set of data to produce a working set of data. For example, a computing device 100 (FIG. 1) determines to train ML model 102 (which may implement any kind of ML model, as a Random Forest model, an artificial neural networks model, a Gaussian mixture model, etc.) based on: unlabeled data 104, labeled data 106, k=8 partitions, and n=1 label-training iterations.

Based on determining to train ML model 102, computing device 100 assigns, to each data point in unlabeled data 104, a random label. According to an embodiment, when initializing the random labels for the unlabeled data 104, prior knowledge is encoded. For example, in a 1-class classification where 99% of the data is assumed to have a label of "0" and 1% of the data is assumed to have a label of "1", random labels are assigned to data points of an unlabeled data set proportionately to this prior. Encoding prior knowledge in assigning random labels simulates realistic labeling and facilitates utilization of this data as training data for semi-supervised learning.

To further illustrate, ML model 102 is being trained to detect unsafe anomalies in computer network data. Labeled data 106 represents a small amount of network traffic data that has been labeled by a subject-matter expert, where the data is labeled one of: "not anomalous", "anomalous, safe", or "anomalous, unsafe". Unlabeled data 104 represents a relatively large amount of network traffic data that has not been labeled. Computing device 100 randomly labels the data points in unlabeled data 104 based on the following proportions based on prior knowledge of the nature of anomalous network traffic data: 95% "not anomalous", 4% "anomalous, safe", and 1% "anomalous, unsafe".

Figure 3:
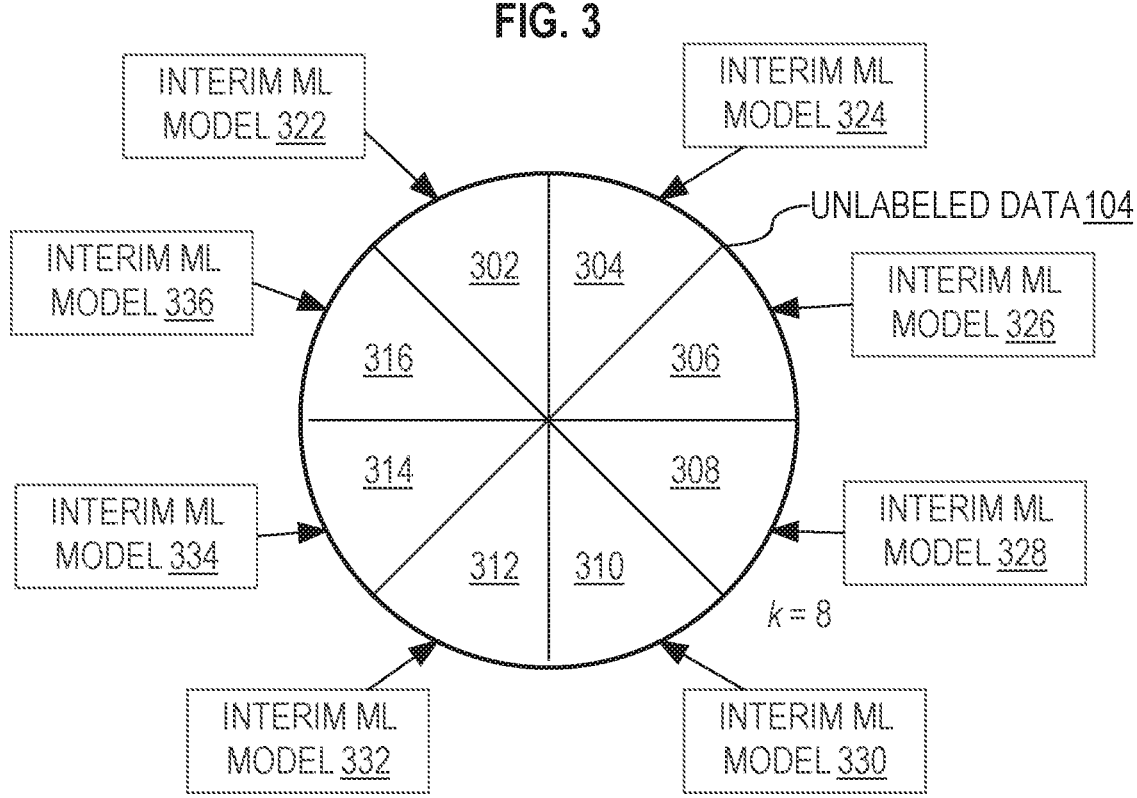
FIG. 3 depicts unlabeled data partitioned into k partitions.

After the data points of unlabeled data 104 are assigned labels, the data set is referred to herein as "previously-unlabeled data 104" or a "working set of data". At step 204, the working set of data is partitioned into a plurality of data partitions. For example, as depicted in FIG. 3, computing device 100 partitions previously-unlabeled data 104 into k=8 partitions 302-316.

According to an embodiment, a set of predicted labels is produced for each data point in the previously-unlabeled data set by, for each data partition of the plurality of data partitions, performing steps 206 and 208. Specifically, at step 206, an interim machine-learning model is trained based on a set of labeled data and said each data partition to produce a trained interim machine-learning model. For example, computing device 100 trains a respective interim ML model (one of ML models 322-336) based on the randomly-labeled data from a corresponding data partition of data partitions 302-316, as well as on labeled data 106. To illustrate, ML model 322 is trained on the combination of randomly labeled data in partition 302 and labeled data 106; ML model 324 is trained on the combination of randomly labeled data in partition 304 and labeled data 106; and so on.

At step 208, the trained interim machine-learning model is applied to predict a predicted label for data points in a set of data partitions, of the plurality of data partitions, other than said each data partition. For example, computing device 100 uses each ML model, of ML models 322-336, to predict a label for each data point in the data partitions of previously-unlabeled data 104, other than the data partition used to train the ML model. To illustrate, ML model 322 is used to predict labels for data points in all of partitions 304-316; ML model 324 is used to predict labels for data points in all of partitions 302 and 308-316; and so on. After applying the interim trained ML models to predict labels for previously-unlabeled data 104, each data point in previously-unlabeled data 104 is associated with k−1 predicted labels.

At step 210, for each data point of the working set of data: a composite predicted label is generated based on the set of predicted labels for said each data point, and the composite predicted label is applied to said each data point. For example, for a given data point in previously-unlabeled data 104, computing device 100 determines a composite label based on the k−1 predicted labels associated with the data point. To illustrate, because model 102 is a classification-type model, computing device 100 determines the composite label for a given data point by identifying the most common label, associated with the data point, among the k−1 predicted labels associated with the data point.

Figure 4:
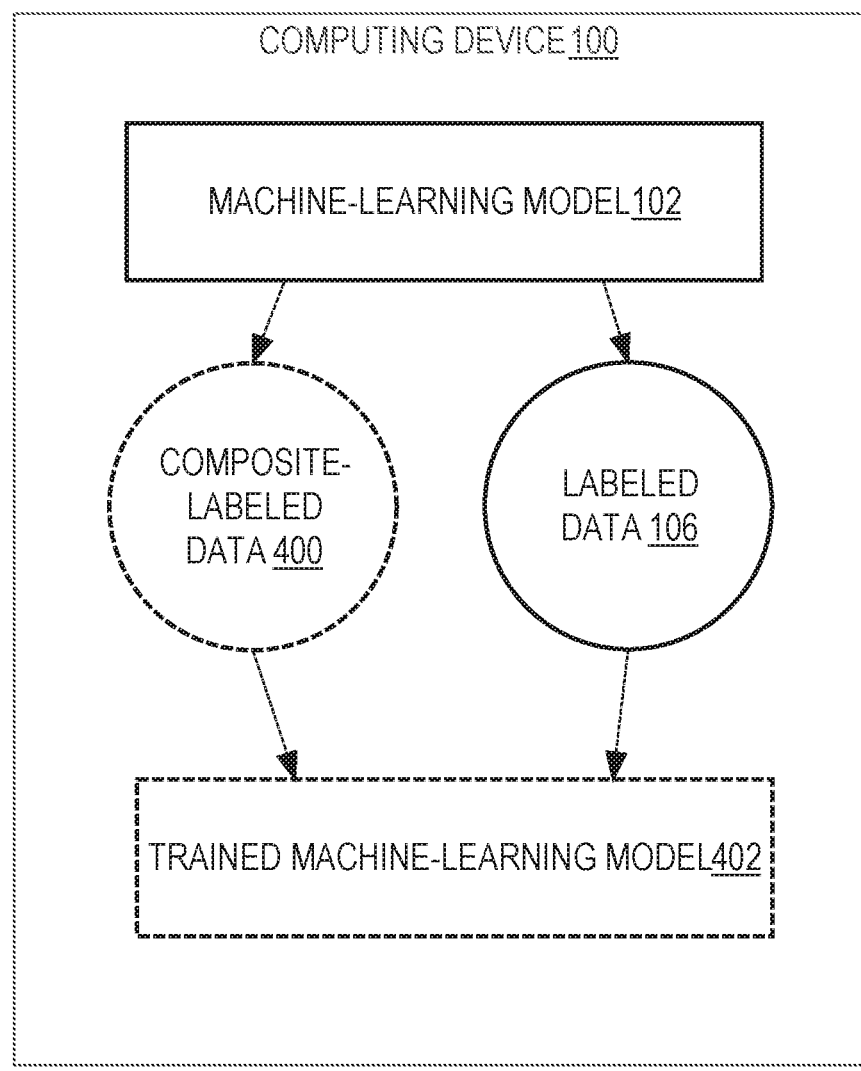
FIG. 4 is a block diagram that depicts training a machine-learning model, on previously-unlabeled data and labeled data, to produce a trained machine-learning model.

According to an embodiment, computing device 100 replaces the randomly-generated labels, associated with the data points in previously-unlabeled data 104, with the composite labels generated for the data points to produce composite-labeled data 400 depicted in FIG. 4. According to an embodiment, composite-labeled data 400 includes the same data points as previously-unlabeled data 104, except that the data points are associated with predicted composite labels, as described above.

At step 212, after applying the composite predicted label to each data point, of the working set of data, a particular machine-learning model is trained based, at least in part, on the working set of data and the set of labeled data. For example, because the required number of label-training iterations is one, computing device 100 determines to train model 102 based on composite-labeled data 400 after the single label-training iteration. This is a non-limiting example, and the total number of label-training iterations may be any number, including the number of times it takes for the predicted labels to converge.

Accordingly, device 100 trains ML model 102 based on composite-labeled data 400 and labeled data 106 to produce a trained ML model 402, as shown by the dotted arrows connecting ML model 102 to composite-labeled data 400 and labeled data 106, and then connecting composite-labeled data 400 and labeled data 106 to trained ML model 402.

At step 214, the trained particular machine-learning model is applied to infer a prediction for a particular data point. For example, after producing trained ML model 402, computing device 100 applies trained ML model 402 to infer one or more predictions for one or more unlabeled data points, e.g., over which ML model 402 was not trained. To illustrate, computing device 100 applies trained ML model 402 to a set of unlabeled data, other than unlabeled data 104, that represents network traffic to predict whether each data point is "not anomalous", "anomalous, safe", or "anomalous, unsafe".

According to embodiments, the relative amount of labeled data used to train an ML model using GEM described above, when compared to the amount of available unlabeled data, is proportional to the skew of expected predictions for the unlabeled data. For example, in anomaly detection analysis described above, the expected labels for a given set of unlabeled data are heavily skewed, where the vast majority of the data points are expected to be labeled "not anomalous". Thus, a relatively small amount of labeled data, a portion of which is labeled as anomalous, is required to offset the random nature of the labels assigned to the unlabeled data based on this prior knowledge.

However, with less-skewed expected prediction proportions, a relatively larger amount of labeled data aids in the accuracy of semi-supervised training of an ML model based on GEM. As such, when the proportions of expected predictions are skewed, significant resource and cost savings are realized with application of GEM-based training techniques.

Experimentation for Aspects of Gem

According to an embodiment, k is selected based on one or more experiments. To illustrate, for a labeled dataset that is similar in composition (i.e., similar proportions of labels or expected labels) to unlabeled data 104 and labeled data 106, the labels on a majority of the dataset points are hidden. GEM is applied (as described in detail above) to train multiple test ML models, each using a different value for k within a range of k values. Each of the resulting trained ML models is used to predict labels for the dataset and the predictions are compared to the hidden labels of the data to produce model-specific accuracy metrics. According to an embodiment, the lowest k value that was used to train an ML model with over a threshold accuracy metric is selected as the k value for GEM.

According to an embodiment, experimentation may be used to identify effective ratios of labeled to unlabeled data. To illustrate, multiple experimentation datasets are generated from a labeled dataset, which is similar in composition to unlabeled data 104 and labeled data 106, by hiding various percentages of labels within the dataset. The different experimentation datasets are then used to train multiple ML models using GEM techniques described above. Each of the resulting trained models is used to predict values for the labeled dataset and the predictions are compared to the hidden labels of the data to produce model-specific accuracy metrics. The ratio of labeled to unlabeled data for the ML model that was trained on the lowest percentage of labeled data, which also has an accuracy metric that is over a threshold, is selected as the target labeled to unlabeled data ratio for GEM.

Machine Learning

Machine learning can encode, within trained models, classification algorithms to classify sequential data (such as: natural language sentences; a series of events resulting from user interaction with a website; network streams; etc.). Classification algorithms classify portions of sequential data with labels, and accurate classification algorithms can be used to glean information from sequential data without intervention of a human. For example, a machine learning algorithm uses a small amount of labeled data to learn an algorithm that classifies English sentences as having positive, negative, or neutral sentiments. As further examples, such a machine learning algorithm can learn whether the behavior, of a consumer represented as a time-series of an online profile, has changed; or to detect attackers in network traffic; or even to automatically find semantic mistakes in computer programs.

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programming languages including C#, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer $L-1$ to a layer $L$. Given the number of nodes in layer $L-1$ and $L$ is $N[L-1]$ and $N[L]$, respectively, the dimensions of matrix W are $N[L-1]$ columns and $N[L]$ rows.

Biases for a particular layer L may also be stored in matrix B having one column with $N[L]$ rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. Error calculation and backpropagation occurs as explained above. Unsupervised model training is more involved because desired outputs need to be discovered during training. Unsupervised training may be easier to adopt because a human expert is not needed to label training examples in advance. Thus, unsupervised training saves human labor.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally, or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACKPROPAGATION THROUGH TIME".

Random Forest

Random Forests or Random Decision Forests are an ensemble of learning approaches that construct a collection of randomly generated nodes and decision trees during the training phase. The different decision trees are constructed to be each randomly restricted to only particular subsets of feature dimensions of the data set. Therefore, the decision trees gain accuracy as the decision trees grow without being forced to over fit the training data as would happen if the decision trees were forced to be restricted to all the feature dimensions of the data set. Predictions for the time-series are calculated based on the mean of the predictions from the different decision trees.

The following is an example and non-limiting method of training a set of Random Forest models for making estimations of network I/O utilization for an example model type, i.e., a ToR switch ML model, according to an embodiment. A best trained Random Forest ToR switch ML model is selected, from a set of models resulting from the training phase, to be the basis for instances of a trained ToR switch ML model deployed to respective ToR switches, e.g., in a datacenter. An ML service running on a computing device produces a training data set for ToR switch ML models. In some embodiments, the ML service preprocesses the historical utilization data gathered from the non-OS sources prior to labeling the training data that will be used to train the Random Forest ToR switch ML model. The preprocessing may include cleaning the readings for null values, normalizing the data, downsampling the features, etc.

In an embodiment, the ML service receives hyper-parameter specifications for the Random Forest ToR switch ML model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

The Random Forest ToR switch ML model is trained using the specified hyper-parameters and the training data set (or the preprocessed sequence training data, if applicable). The trained model is evaluated using the test and validation data sets, as described above.

According to embodiments, a determination is made of whether to generate another set of hyper-parameter specifications. If so, another set of hyper-parameter specifications is generated and another Random Forest ToR switch ML model is trained having the new set of hypermeters specified. All Random Forest ToR switch ML models trained during this training phase are the set of models from which the best trained ToR switch ML model is chosen.

Computing System Information

A process or application comprises a combination of the software and allocation of resources from a machine node. Specifically, a process or application is a combination of integrated software components and an allocation of computational resources, such as memory, a machine node (i.e., a computing device and/or memory accessible to the computing device), and/or sub-processes on the machine node for executing the integrated software components on a processor, the combination of the software and computational resources being dedicated to performing a particular function, e.g., on behalf of one or more clients.

One or more of the functions attributed to any process described herein, may be performed by any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
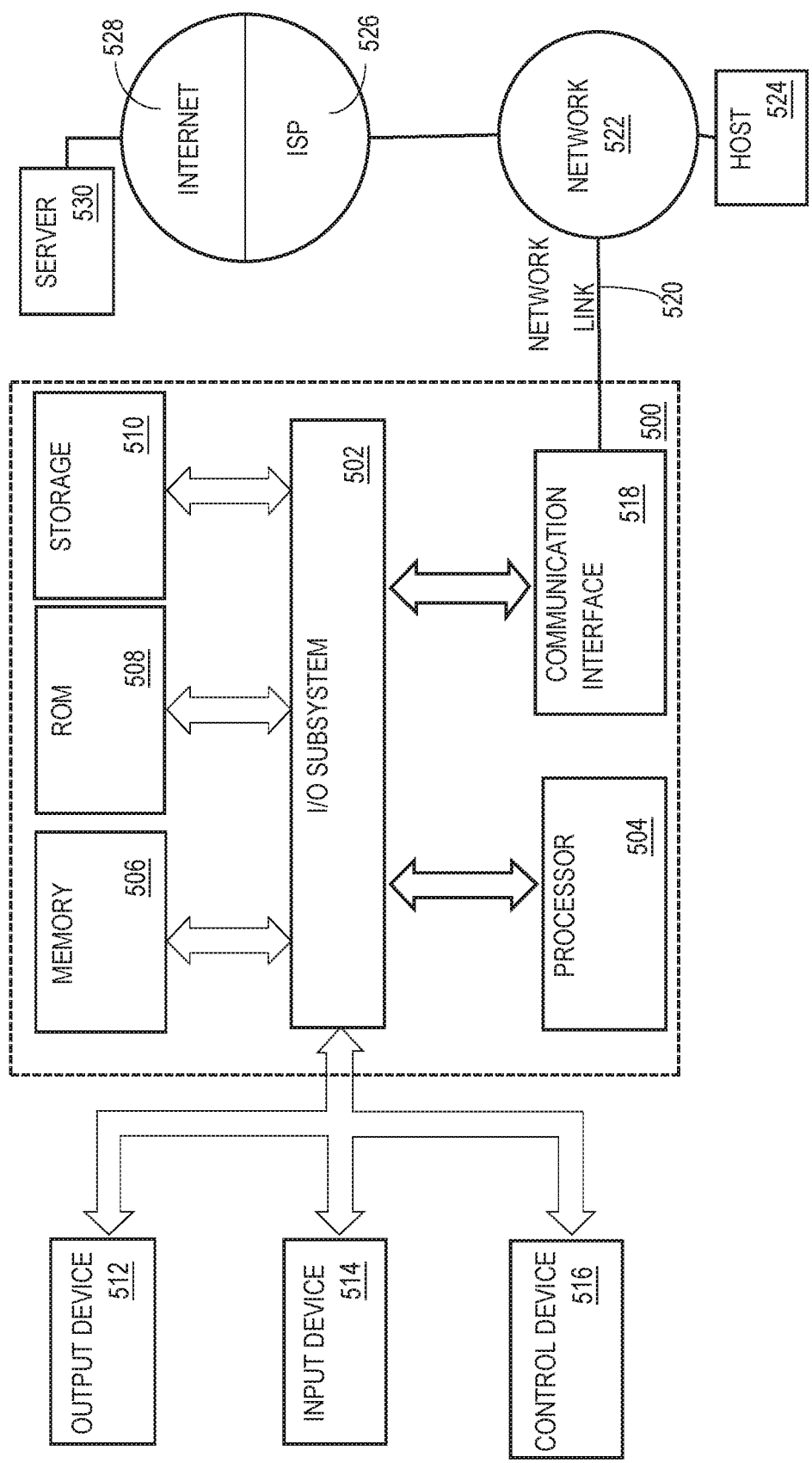
FIG. 5 depicts a computer system that may be used in an embodiment.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
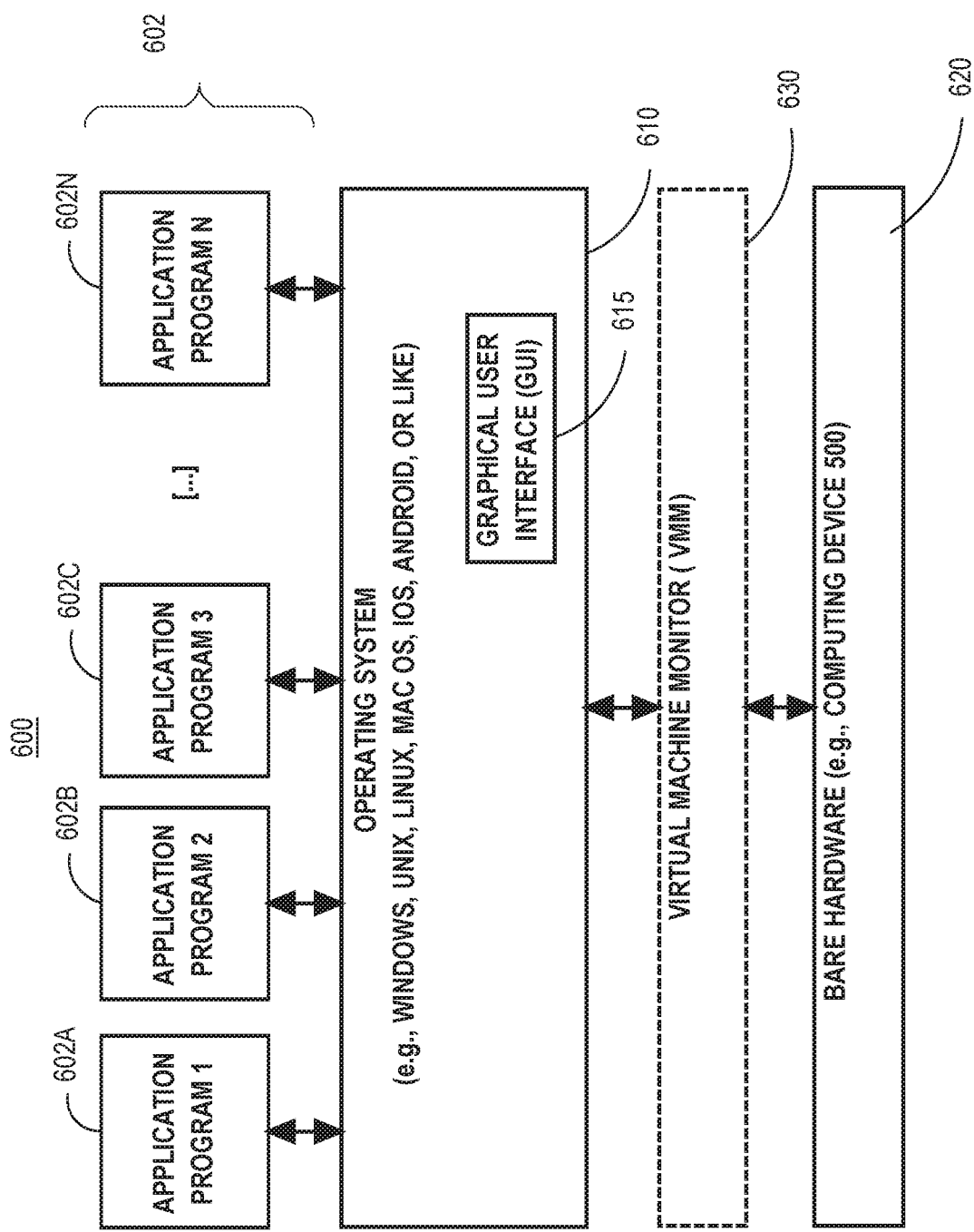
FIG. 6 depicts a software system that may be used in an embodiment.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
    assigning a random label to each data point in an unlabeled set of data to produce a working set of data;
    partitioning the working set of data into a plurality of data partitions;
    producing a respective set of predicted labels corresponding to each data point in the working set of data by, for each given data partition of the plurality of data partitions:
        training an interim machine-learning model based on a set of labeled data and the given data partition to produce a trained interim machine-learning model instance corresponding to the given data partition, and
        applying the trained interim machine-learning model instance to predict a predicted label for data points in a set of two or more data partitions, of the plurality of data partitions, other than the given data partition,
        wherein each predicted label in the respective set of predicted labels of a particular data point in the working set of data is predicted by a respective interim machine-learning model instance trained based on a corresponding data partition, of the plurality of data partitions, other than a particular data partition containing the particular data point;
    for each given data point of the working set of data:
        based on the set of predicted labels corresponding to the given data point, generating a composite predicted label, and
        applying the composite predicted label to the given data point in the working set of data;
    after applying the composite predicted label to each data point, of the working set of data, training a particular machine-learning model based, at least in part, on the working set of data and the set of labeled data; and
    applying the trained particular machine-learning model to infer a prediction for one or more inference data points;
    wherein the method is performed by one or more computing devices.

2. The computer-executed method of claim 1, further comprising, prior to training the particular machine-learning model and after applying the composite predicted label to each data point, of the working set of data, using the working set of data to produce a respective second set of predicted labels corresponding to each data point in the working set of data by, for each given data partition of the plurality of data partitions:
    training a second interim machine-learning model based on the set of labeled data and the given data partition to produce a second trained interim machine-learning model instance corresponding to the given data partition, and
    applying the second trained interim machine-learning model instance to predict a second predicted label for data points in a set of two or more data partitions, of the plurality of data partitions, other than the given data partition to generate a second set of predicted labels; and
    for each given data point of the working set of data:
        based on the second set of predicted labels corresponding to the given data point, generating a second composite predicted label, and
        applying the second composite predicted label to the given data point in the working set of data,
    wherein training the particular machine-learning model is performed after applying the second composite predicted label to each data point of the working set of data.

3. The computer-executed method of claim 1, wherein assigning a random label to each data point in the unlabeled set of data to produce the working set of data comprises:

identifying a particular label, of a plurality of labels, for said each data point based, at least in part, on a plurality of percentages;

wherein each label, of the plurality of labels, is associated with a respective percentage of the plurality of percentages.

4. The computer-executed method of claim 1, wherein:

the particular machine-learning model is a classification model; and generating a particular composite predicted label for a particular data point, of the working set of data, based on a particular set of predicted labels corresponding to the particular data point comprises determining the particular composite predicted label based on a mode of the particular set of predicted labels.

5. The computer-executed method of claim 1, wherein:

the particular machine-learning model is a regression model; and generating a particular composite predicted label for a particular data point, of the working set of data, based on a particular set of predicted labels corresponding to the particular data point comprises determining the particular composite predicted label based on one or more of:
 a mode of the particular set of predicted labels,
 a median of the particular set of predicted labels,
 a geometric mean of the particular set of predicted labels,
 a mean of the particular set of predicted labels, or
 a standard deviation of the particular set of predicted labels.

6. The computer-executed method of claim 1, wherein applying the trained particular machine-learning model to infer the prediction for the one or more inference data points comprises inferring whether the one or more inference data points reflect an anomaly.

7. The computer-executed method of claim 1, wherein the particular machine-learning model is one of: a Random Forest model, or an artificial neural network.

8. One or more non-transitory computer-readable media storing one or more sequences of instructions that, when executed by one or more processors, cause:

assigning a random label to each data point in an unlabeled set of data to produce a working set of data;

partitioning the working set of data into a plurality of data partitions;

producing a respective set of predicted labels corresponding to each data point in the working set of data by, for each given data partition of the plurality of data partitions:
 training an interim machine-learning model based on a set of labeled data and the given data partition to produce a trained interim machine-learning model instance corresponding to the given data partition, and
 applying the trained interim machine-learning model instance to predict a predicted label for data points in a set of two or more data partitions, of the plurality of data partitions, other than the given data partition,
 wherein each predicted label in the respective set of predicted labels of a particular data point in the working set of data is predicted by a respective interim machine-learning model instance trained based on a corresponding data partition, of the plurality of data partitions, other than a particular data partition containing the particular data point;

for each given data point of the working set of data:
 based on the set of predicted labels corresponding to the given data point, generating a composite predicted label, and
 applying the composite predicted label to the given data point in the working set of data;

after applying the composite predicted label to each data point, of the working set of data, training a particular machine-learning model based, at least in part, on the working set of data and the set of labeled data; and applying the trained particular machine-learning model to infer a prediction for one or more inference data points.

9. The one or more non-transitory computer-readable media of claim 8, wherein the one or more sequences of instructions further comprise instructions that, when executed by one or more processors, cause, prior to training the particular machine-learning model and after applying the composite predicted label to each data point, of the working set of data, using the working set of data to produce a respective second set of predicted labels corresponding to each data point in the working set of data by, for each given data partition of the plurality of data partitions:

training a second interim machine-learning model based on the set of labeled data and the given data partition to produce a second trained interim machine-learning model instance corresponding to the given data partition, and applying the second trained interim machine-learning model instance to predict a second predicted label for data points in a set of data partitions, of the plurality of data partitions, other than the given data partition to generate a second set of predicted labels; and for each given data point of the working set of data:
 based on the second set of predicted labels corresponding to the given data point, generating a second composite predicted label, and
 applying the second composite predicted label to the given data point in the working set of data, wherein training the particular machine-learning model is performed after applying the second composite predicted label to each data point of the working set of data.

10. The one or more non-transitory computer-readable media of claim 8, wherein assigning a random label to each data point in the unlabeled set of data to produce the working set of data comprises:

identifying a particular label, of a plurality of labels, for said each data point based, at least in part, on a plurality of percentages;

wherein each label, of the plurality of labels, is associated with a respective percentage of the plurality of percentages.

11. The one or more non-transitory computer-readable media of claim 8, wherein:

the particular machine-learning model is a classification model; and generating a particular composite predicted label for a particular data point, of the working set of data, based on a particular set of predicted labels corresponding to the particular data point comprises determining the particular composite predicted label based on a mode of the particular set of predicted labels.

12. The one or more non-transitory computer-readable media of claim 8, wherein:

the particular machine-learning model is a regression model; and generating a particular composite predicted label for a particular data point, of the working set of data, based on a particular set of predicted labels corresponding to the particular data point comprises determining the particular composite predicted label based on one or more of:

a mode of the particular set of predicted labels, a median of the particular set of predicted labels, a geometric mean of the particular set of predicted labels, a mean of the particular set of predicted labels, or a standard deviation of the particular set of predicted labels.

13. The one or more non-transitory computer-readable media of claim 8, wherein applying the trained particular machine-learning model to infer the prediction for the one or more inference data points comprises inferring whether the one or more inference data points reflect an anomaly.

14. The one or more non-transitory computer-readable media of claim 8, wherein the particular machine-learning model is one of: a Random Forest model, or an artificial neural network.

\* \* \* \* \*